Figure 1:
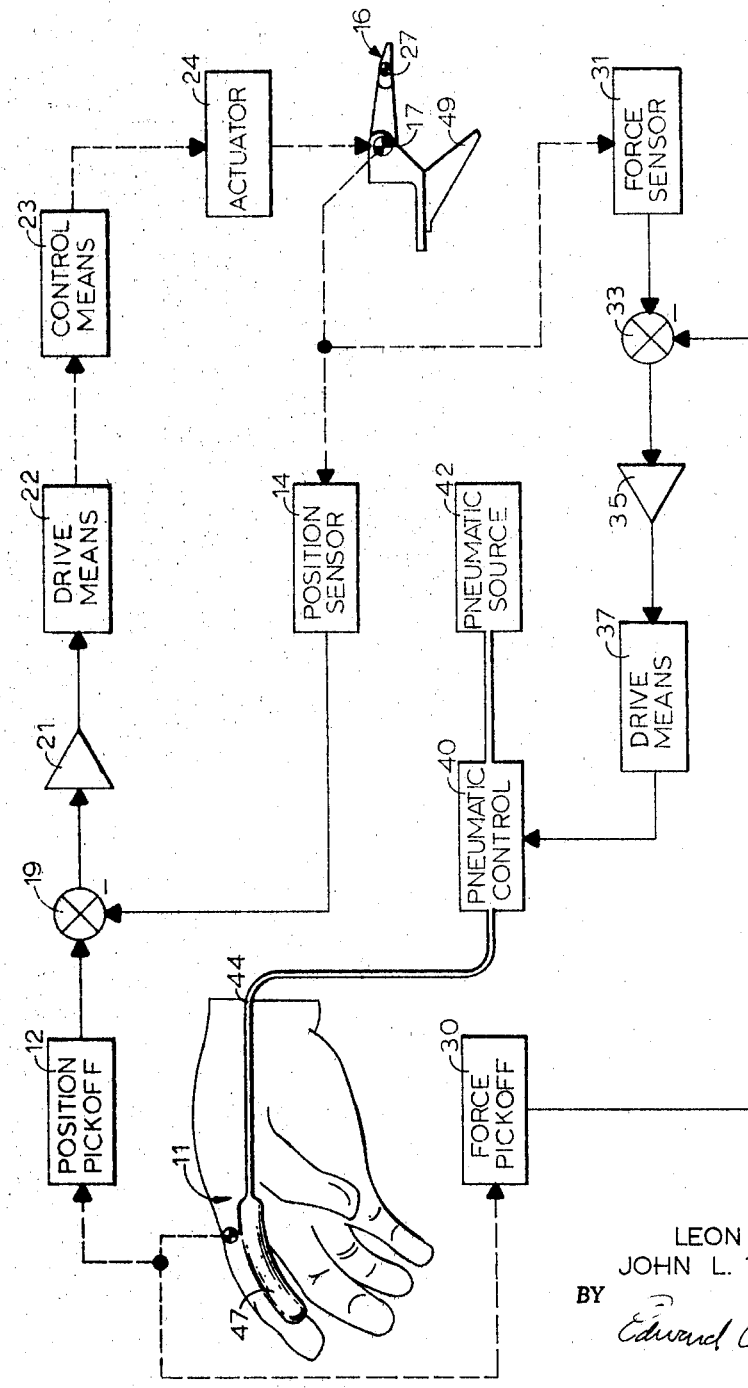

Aug. 2, 1966  L. JONES ETAL  3,263,824
SERVO CONTROLLED MANIPULATOR DEVICE
Filed Dec. 20, 1963  4 Sheets-Sheet 3

INVENTORS
LEON JONES
JOHN L. THOUSAND
BY
*Edward A. Sokolski*
ATTORNEY

3,263,824
SERVO CONTROLLED MANIPULATOR DEVICE

Leon Jones, Garden Grove, and John L. Thousand, Newport Beach, Calif., assignors to Northrop Corporation, Beverly Hills, Calif., a corporation of California
Filed Dec. 20, 1963, Ser. No. 332,221
16 Claims. (Cl. 214—1)

This invention relates to a servo controlled manipulator device and more particularly to such a device for precisely controlling gripping action in response to the hand of the operator.

Remotely controlled manipulator devices are highly useful in precisely controlling manual type operations in areas where the presence of a human operator is unfeasible. Thus, remotely controlled manipulators are utilized for performing operations in hazardous areas such as, for example, where there is a high degree of radioactivity or in situations where an extremely high condition of cleanliness is essential which makes the presence of human operators undesirable.

To perform the required functions properly, it is necessary to simulate actions performed by the human arm and hand. The device of this invention is concerned with hand action and is made to operate in conjunction with a robot arm which may be of a type known in the prior art.

Remotely controlled hand-like manipulators of the prior art generally operate in conjunction with a lever or handle which the operator moves to produce the desired end result. This type of device while capable of producing a proper control signal for the manipulator device, fails to give the operator the tactile and kinesthetic sensations he would experience were he performing the task himself. These devices are therefore difficult to operate properly and often require extensive operator training for satisfactory utilization. With such devices of the prior art, it is difficult for the operator to control the pressure applied to objects by the manipulator and where such objects are fragile it is often difficult to prevent inadvertent breakage due to the application of excessive pressure.

These shortcomings of prior art hand type manipulator devices are overcome in the device of the invention by utilizing a glove control which the operator wears in performing the control operations. The glove has a separate pick-off positioned where each of one or more of the finger joints is located. The output of this position pick off is compared with the output of a similar sensor located at a corresponding joint in the manipulator device and the difference signal therebetween utilized to control a pneumatic actuator device which positions the manipulator joint so that it corresponds with the position of the associated finger joint of the operator. A unique pneumatic actuator system is utilized to control the positioning of the manipulator device.

Bladder means are further provided in the glove to give the operator a kinesthetic sensation which closely simulates the force being placed on the controlled object by the manipulator, thus preventing the application of an excessive amount of such force. This bladder operates in response to a pneumatic control which regulates the flow of air thereto in response to a servo system. In achieving this servo control, a signal indicating the position of the manipulator is compared with a signal indicating the position of the glove finger and the error signal therebetween is amplified and utilized to effect the desired control.

Thus, where these two signals are substantially equal, as would be the case where the manipulator were faithfully following the finger of the operator, there is substantially no pneumatic signal fed to the bladder in the glove. However, when the manipulator can no longer faithfully follow the glove, as for example, when the manipulator is abutting tightly against the surface of the object being retained, the error signal produced in the servo system, will cause the pneumatic control to inflate the bladder. Such inflation is in proportion to the error signal and represents the force being applied to the object by the manipulator. The bladder is positioned across the joints of the fingers and when inflated, applies a force thereto which tends to straighten the fingers out. This applied force closely simulates the resistance which would be encountered were the object held by the manipulator actually being grasped by the operator, himself.

It is therefore an object of this invention to provide a servo controlled manipulator device providing more natural tactile and kinesthetic sensations to the operator thereof.

It is a further object of this invention to facilitate the operation of servo manipulator devices.

It is still another object of this invention to provide a servo manipulator device which is less likely to apply excess force to objects being manipulated.

It is still a further object of this invention to provide an improved servo manipulator device utilizing pneumatic control.

It is still a further object of this invention to provide an improved servo manipulator device utilizing a glove which the operator wears in performing the control operations which has a pneumatic bladder therein which is inflated in response to the application of force to the manipulated object.

Figure 2:
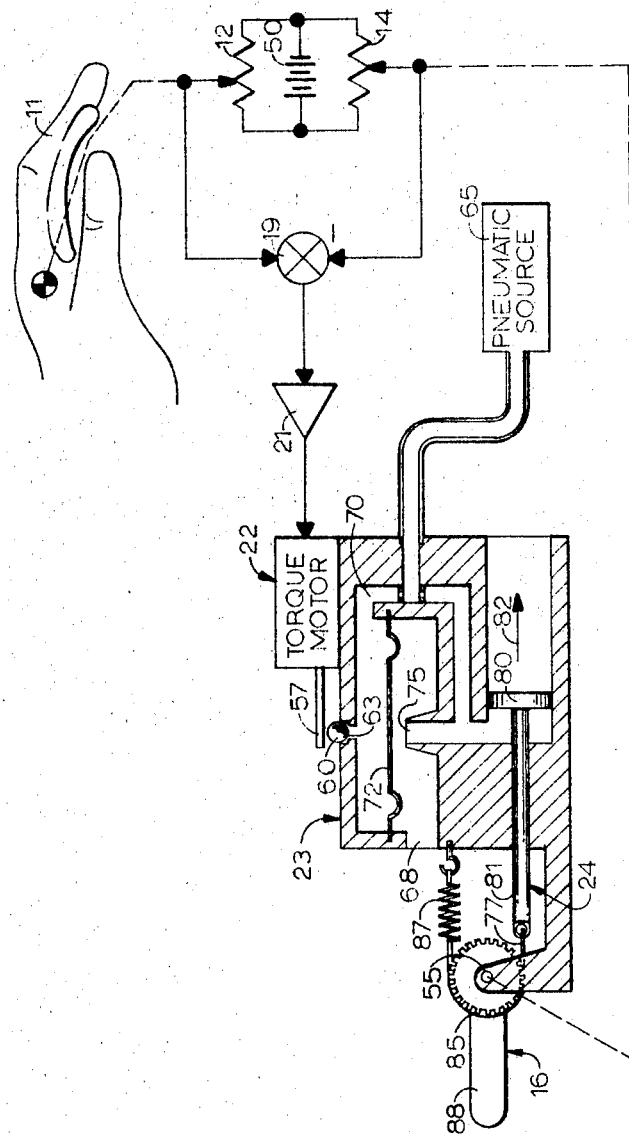
Figure 3:
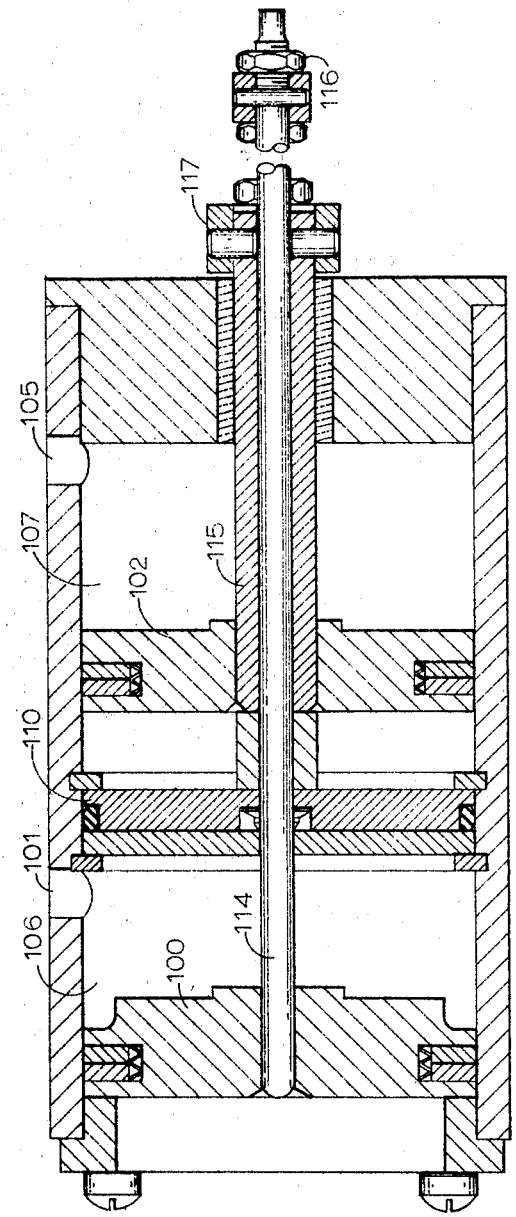
Figure 4:
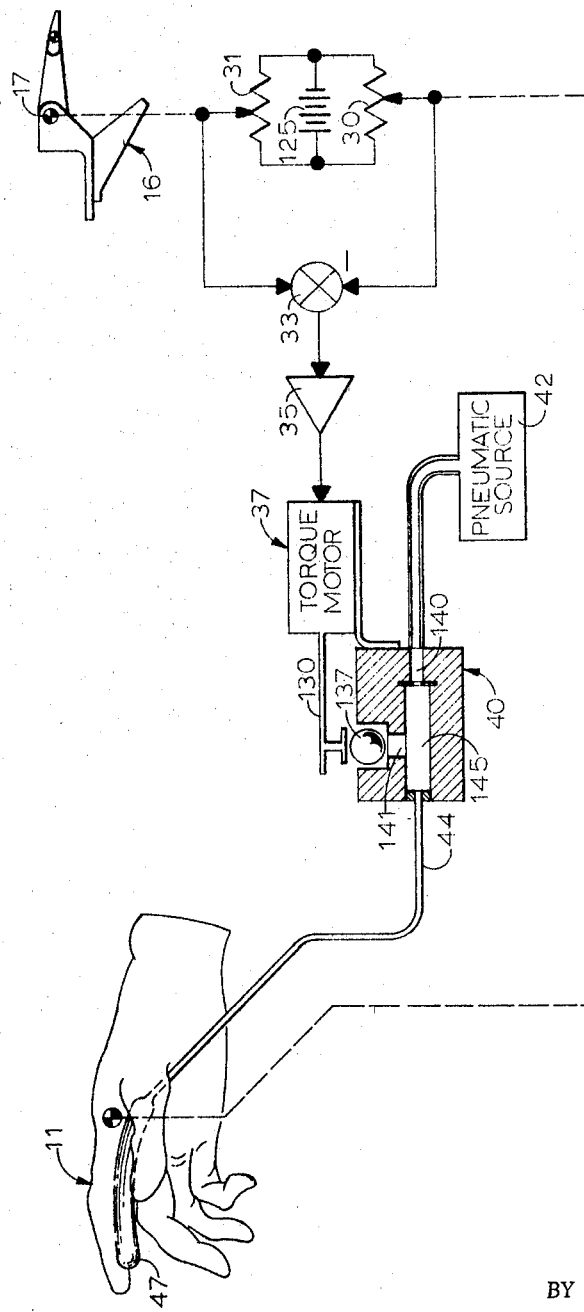

Other objects of this invention will become apparent from the following description taken in connection with the accompanying drawings of which FIG. 1 is a block diagram illustrating the basic operation of the device of the invention, FIG. 2 is a schematic drawing illustrating the operation of the position control of a preferred embodiment of the device of the invention, FIG. 3 is a cross sectional view of a dual piston drive mechanism which may be utilized in conjunction with the embodiment of FIG. 2 to control two separate joints, and FIG. 4 is a schematic drawing illustrating the operation of the force reflection control of a preferred embodiment of the device of the invention.

Referring now to FIG. 1, a block diagram illustrating the basic operation of the device of the invention is shown. Glove 11 is placed on the operator's hand. A position pickoff 12 which may be a rotary potentiometer, is connected to glove 11 so that its wiper arm is moved in accordance with the rotary motion of one of the finger joints of the hand of the operator. As illustrated in FIG. 1, positioned pickoff 12 senses the motion of the knuckle joint. In a typical embodiment of the device of the invention, a separate such pickoff might also be applied to one or more of the other joint positions to separately sense the motion of such joints. A control system for the associated joint in the manipulator device, as to be described in connection with position pickoff 12, would be provided for each of such pickoffs.

Position sensor 14 which is similar in its configuration and operation to position pickoff 12 senses the rotational position of joint 17 in manipulator device 16. The outputs of pickoff 12 and sensor 14 are fed to summing device 19. When the position of joint 17 in the manipulator corresponds to the position of the associated joint in glove 11, summing device 19 has no output. When there is a difference, however, between these two positions, summing device 19 will have an output indicating such difference in the form of an error signal. The error signal output of summing device 19 is amplified in amplifier 21 and fed to drive means 22, which may be a torque motor. Drive means 22 actuates control device 23 which in turn controls actuator 24. Actuator 24 which may be pneumatically driven, positions joint 17 in accordance with the error signal to bring it into correspondence with the associated joint in glove 11, thereby cancelling out the error signal.

Thus, by a simple servo control mechanism, each joint in the manipulator hand is made to precisely correspond to the associated joint of the operator's hand contained within the glove. An identical control system may be provided for other joints of the manipulator device 16 such as, for example, joint 27 to similarly cause such joint to be positioned in accordance with a corresponding joint in glove 11.

Force pickoff 30 operates similarly to position pickoff 12 in sensing the rotational position of one of the joints in glove 11. Force sensor 31 similarly to position sensor 14, produces an output signal in accordance with the rotational position of joint 17 of the manipulator. The outputs of force pickoff 30 and force sensor 31 are compared in summing device 33, the output of which reflects the difference therebetween. When manipulator device 16 is faithfully following glove 11, there is little or no output signal fed from summing device 33 to amplifier 35. However, when the rotatable finger of manipulator 16 stops following the corresponding fingers in glove 11, a significant difference signal is fed from summing device 33 to amplifier 35.

Under such conditions, the output of amplifier 35 causes drive means 37 which may comprise a torque motor, to actuate pneumatic control 40 in accordance with the difference signal. Pneumatic control 40 controls the passage of air from pneumatic source 42 through line 44 to bladder 47. Bladder 47 is thus inflated in accordance with the actuation of pneumatic control 40 by drive means 37. Bladder 47 is contained on the palm side of the glove and runs across the finger joints thereof. As it is inflated, it tends to cause the finger joints to straighten up and thereby applies a force in accordance with the error difference signal which is counter to the grasping action of the hand contained within the glove. This force accurately simulates the resistance force which would be experienced were the operator's hand grasping the object retained by the manipulator device.

In this fashion, a realistic tactile and kinesthetic sensation of the force being encountered is reflected to the operator. It is to be noted that finger 49 in the manipulator is stationary and there is no pickoff associated with the thumb of glove 11.

Referring now to FIG. 2, a schematic drawing illustrating a preferred embodiment of the positioning mechanism of the device of the invention is shown. In this drawing, parts similar to those shown in FIG. 1 are identified by like numerals. The positioning of a joint of glove 11 is sensed by pickoff potentiometer 12 which may be a rotary potentiometer whose wiper arm rotates in accordance with angular motion of the joint with which it is associated. Position sensor 14 is a similar rotary potentiometer whose arm is connected to rotate with rotary joint 55 of manipulator 16. A D.C. reference voltage is applied across both potentiometers 14 and 12 from D.C. power source 50.

The wiper arms of potentiometers 12 and 14 are connected to summing device 19 in opposite polarity to produce an output voltage from the summing device which represents the difference between their angular positions. This difference or error signal is amplified in amplifier 21 and thence fed to torque motor 22. Thus torque motor 22 is driven in accordance with the difference in angular position between corresponding joints in glove 11 and manipulator device 16 as sensed by their associated rotary potentiometers.

Torque motor 22 has an output lever arm 57 which is actuated downward in accordance with the error signal fed thereto. Torque motor 22 may comprise a solenoid which drives lever arm 57 downward directly proportional to the D.C. input fed thereto. When torque motor 22 is actuated to drive lever arm 57 downward, the lever arm moves against ball 60, closing valve 63 formed in the top of pneumatic control device 23.

A gas which may, for example, be pressurized air is fed from pneumatic source 65 to the control device. When ball 60 is not being actuated by lever arm 57 to close valve 63, the air entering chamber 70 from pneumatic source 65 is vented past ball 60. The air also passes through port 75 and is vented out through exhaust port 68. As valve 63 is closed by ball 60, the pressure in chamber 70 increases driving flexible diaphragm 72 downward towards port 75. This limits the flow path through port 75 to exhaust port 68. With the exhaust flow path thus limited, the pneumatic pressure acting on piston 80 increases to drive this piston in the direction indicated by arrow 82. Piston 80 is thereby driven as indicated by arrow 82 in accordance with the error signal.

One end of chain 77 is attached to the shaft 81 of piston 80. This chain engages sprockets 85 on drive wheel 55 and is attached at the other end thereof to spring 87 which in turn is attached to the frame of pneumatic control device 23. As piston 80 is driven to the right it rotates wheel 55, which is rotatably mounted on the frame of manipulator 16, in accordance with such motion. Spring 87 provides a return force to bring wheel 55 and piston 80 to a predetermined "null" position in the absence of an actuating force on the piston when there is no input signal.

A joint of finger 88 is fixedly attached to wheel 55 and is rotated in accordance with the input drive. As already noted, a separate such drive system is utilized to control each joint of the manipulator device to provide response thereof in accordance with a corresponding glove joint.

Referring now to FIG. 3, a piston drive mechanism which may be utilized in the device of the invention to drive a pair of manipulator joints is illustrated. Piston 100 is driven to the left by pressurized air entering chamber 106 through port 101 and provided by means of a system such as illustrated in FIG. 2. Piston 102 is similarly driven to the left by means of air entering chamber 107 through port 105 from a second separate actuation system similar to that shown and described in connection with FIG. 2. The piston chamber for pistons 100 and 102 are isolated from each other by means of airtight wall 110. Drive shaft 114 of piston 100 is internally concentric with drive shaft 115 of piston 102. Drive shafts 114 and 115 are separately driven by their associated pistons to provide a corresponding output motion at connector terminals 116 and 117 respectively. Each of these connector terminals is attached to a separate chain (not shown) similar to the chain illustrated in conjunction with FIG. 2, such chain being utilized to rotationally drive a separate joint of the manipulator device in the same fashion as illustrated in FIG. 2. Thus, separate joints can each be controlled in response to an associated control system.

Referring now to FIG. 4 a preferred embodiment of a force control system which may be utilized in the device of the invention is illustrated. Rotary potentiometers 30 and 31 operate in the same general fashion as potentiometers 12 and 14, as described in conjunction with FIG. 2, to sense rotary output motion of an associated joint of glove 11 and manipulator 16 respectively. A D.C. reference voltage is provided for these potentiometers by D.C. power source 125. The wiper arms of potentiometers 30 and 31 are connected to summing device 33 so that the summing device has an output signal in accordance with the difference therebetween. The output of summing device 33 is amplified by amplifier 35 which in turn is fed to torque motor 37. Torque motor 37 may be solenoid motor having an output arm 130 which is driven downward in accordance with the signal fed to the motor.

When joint 17 is faithfully following the motion of the corresponding joint in glove 11, there is only a small error signal being fed to amplifier 35 and to torque motor 37. Under such conditions, drive arm 130 remains substantially in its original resting position. When, however, joint 17 of manipulator 16 can no longer follow the motion of the associated glove joint, as, for example, when the manipulator finger is abutting against the surface of the object being grasped, the error signal fed to the amplifier and thence to the torque motor will increase substantially. Under such conditions, arm 130 is driven downward.

Pressurized gas is fed from pneumatic source 42 into pneumatic control unit 40 through inlet 140. When arm 130 is in the upward or unactuated position, ball 137 is driven upward by the air pressure in chamber 145 and the air fed into the chamber from pneumatic source 42 is passed out of the chamber through aperture 141. When arm 130 is driven downward, however, ball 137 tends to close aperture 141. The air is therefore forced through line 44 to bladder 47. Bladder 47, which as noted, is on the palm side of glove 11, is thereby inflated in accordance with the closing of aperture 141 in response to the error signal fed to torque motor 37. As already noted, the inflation of bladder 47 results in a force tending to straighten up the joints of glove 11, thereby providing a reaction counter to the grasping action of the operator wearing the glove. In this manner a force reflection signal in accordance with the pressure applied by the manipulator device against the object being grasped is applied to the operator's hand to give him a realistic sensation of such force. As the operator moves his fingers apart, the error signal decreases, and the force applied by bladder 47 likewise decreases.

The device of this invention thus provides a simple yet highly effective means for providing precise control of a robot manipulator hand in response to grasping movements of an operator's hand. A force reflection signal is provided which furnishes the operator with a realistic sensation of the pressure being applied against an object being grasped.

While the invention has been described and illustrated in detail, it is to be clearly understood that this is intended by way of illustration and example only and is not to be taken by way of limitation, the spirit and scope of this invention being limited only by the terms of the following claims.

We claim:
1. A servo controlled manipulator device comprising
 a manipulator hand having at least one joint therein,
 a control glove having at least one finger portion therein,
 first servo means for rotatably positioning the joint of said manipulator hand in accordance with the position of said finger portion of said glove, said servo means including means for pneumatically actuating the joint of said manipulator hand,
 said control glove having an inflatable bladder extending along the longitudinal axis of said finger portion, and
 second servo means for inflating said bladder in accordance with the difference between the rotatable position of the joint of said manipulator hand and the rotatable position of said finger portion.

2. The device as recited in claim 1 wherein the means for pneumatically actuating the joint of said hand includes a pneumatic source, a pneumatic control device connected to receive the output of said pneumatic source, torque motor means for actuating said control device, and means responsive to said control device for actuating said manipulator hand.

3. The device as recited in claim 2 wherein said control device comprises a pneumatic control assembly having a chamber with an exhaust valve therein, said torque motor means having a lever arm for actuating said valve to control the exhaust aperture thereof.

4. The device as recited in claim 1 wherein said second servo means includes means for generating an error signal in accordance with the difference in positions between the joint of said manipulator hand and said finger portion, means responsive to said error signal for producing a pneumatic output signal in accordance therewith, and means for feeding said pneumatic output signal to said bladder.

5. In a manipulator device
 a manipulator hand for grasping an object,
 a control glove for controlling said manipulator hand, said control glove having at least one finger portion therein, and
 means for generating tactile sensations in said glove simulating the pressure being applied by said manipulator hand to said object comprising
 a bladder member mounted in said glove running over substantially the entire longitudinal extent of said finger portion thereof,
 means for sensing the rotational position of said finger portion,
 means for sensing the rotational position of said manipulator hand, and
 means for inflating said bladder member in accordance with the difference between the outputs of said sensing means.

6. The device as recited in claim 5 wherein said means for inflating said bladder includes a pneumatic source, a pneumatic control interposed between said pneumatic source and said bladder, means for comparing the outputs of said sensing means and producing a signal in accordance with the difference therebetween, and drive means responsive to said comparing means for actuating said pneumatic control.

7. In combination,
 a manipulator hand for grasping an object,
 control means for controlling said manipulator hand, said control means including a glove having at least one finger therein,
 means for generating tactile sensations in said glove simulating the pressure being applied by said manipulator hand to said object comprising
 a bladder member mounted in said glove,
 means for sensing the rotational position of said hand,
 means for sensing the rotational position of said finger, and
 means for inflating said bladder member in accordance with the difference between the outputs of said sensing means.

8. The device as recited in claim 7 wherein said control glove means includes servo control means for generating a position control signal for rotatably driving said manipulator hand in accordance with the rotational position of said finger.

9. A servo controlled manipulator device comprising
 a manipulator hand having at least one articulated finger therein,
 a control glove having at least one finger portion therein, said glove including an inflatable bladder mounted therein running along the longitudinal extent of said one finger portion,
 means for sensing the rotational position of the articulated finger of said manipulator hand,
 means for sensing the rotational position of said finger portion of said glove,
 means for comparing the outputs of said sensing means and producing a signal in accordance with the difference therebetween, and
 means for inflating said bladder in accordance with the difference signal produced by said comparing means.

10. The device as recited in claim 9 wherein said sensing means comprise electrical sensors and said means for inflating said bladder comprises means for amplifying the difference signal produced by said comparing means, a pneumatic source, a pneumatic control interposed between said pneumatic source and said bladder, and drive means responsive to the output of said amplifying means for actuating said pneumatic control in accordance with said difference signal.

11. A servo controlled manipulator device comprising
a manipulator hand having at least one articulated finger therein,
a control glove having at least one finger portion therein, said glove including an inflatable bladder mounted therein running along the longitudinal extent of said one finger portion,
first and second means for sensing the rotational position of the articulated finger of said manipulator hand,
first and second means for sensing the rotational position of said finger portion of said glove,
first means for comparing the outputs of said first sensing means and producing a signal in accordance with the difference therebetween,
second means for comparing the outputs of said second sensing means and producing a signal in accordance with the difference therebetween,
means for inflating said bladder in accordance with the difference signal produced by said first comparing means, and
means for driving said manipulator hand in accordance with the output of said second comparing means.

12. A system for controlling a manipulator hand comprising,
a control glove suitable for fitting on the hand of an operator,
pickoff means mounted on said glove for generating an output signal in accordance with the angular rotation of one of the joints of the hand of the operator,
said manipulator hand having a joint therein corresponding to said one of the joints of the operator's hand,
sensor means mounted on said manipulator hand for generating an output signal in accordance with the rotational position of said joint thereof,
means for comparing the outputs of said sensor means and said pickoff means and producing an error signal in accordance with the difference therebetween,
means for amplifying said error signal,
means responsive to said amplifier means for positioning said joint of said manipulator hand in accordance with said error signal,
bladder means in said glove running a substantial portion of the longitudinal extent of the fingers portion thereof,
a pneumatic source,
pneumatic control means interposed between said pneumatic source and said bladder means for controlling the feeding of gas from said source to said bladder, and
means for actuating said pneumatic control means to feed gas to said bladder in accordance with the difference in the rotational positions of said manipulator hand and glove joints.

13. The system as recited in claim 12 wherein said means for positioning said joint of said manipulator hand includes an actuator coupled to said manipulator hand, a torque motor connected to receive the output of said amplifier means, and pneumatic control means responsive to the output of said torque motor for controlling the position of said actuator.

14. A system for controlling a manipulator hand comprising,
a control glove having at least one finger therein,
pickoff means mounted on said finger for generating an electrical output signal in accordance with the angular rotation of said finger,
said manipulator hand having a joint therein,
sensor means mounted on said manipulator hand for generating an output signal in accordance with the rotational position of said joint thereof,
means for comparing the outputs of said sensor means and said pickoff means and producing an error signal in accordance with the difference therebetween,
means for amplifying said error signal,
means responsive to said amplifier means for positioning said joint of said manipulator hand in accordance with said error signal,
bladder means in said glove running a substantial portion of the longitudinal extent of said finger, and
means for inflating said bladder means in accordance with the difference between the rotational positions of said finger and said manipulator hand joint.

15. A system for controlling a manipulator hand comprising
a control glove suitable for fitting on the hand of an operator,
pickoff means mounted on said glove for generating an output signal in accordance with the angular rotation of one of the joints of the hand of the operator,
said manipulator hand having a joint therein corresponding to said one of the joints of the operator's hands,
sensor means mounted on said manipulator hand for generating an output signal in accordance with the rotational position of said joint thereof,
means for comparing the outputs of said sensor means and said pickoff means and producing an error signal in accordance with the difference therebetween,
means for amplifying said error signal, and
means responsive to said amplifier means for positioning said joint of said manipulator hand in accordance with said error signal.

16. The device as recited in claim 15 wherein said means for positioning the joint of said manipulator hand comprises a mechanical actuator, means for pneumatically driving said actuator, and means responsive to said amplifier means for controlling said means for pneumatically driving.

References Cited by the Examiner
UNITED STATES PATENTS
2,656,545 10/1953 Conzelman et al.
2,846,084 8/1958 Goertz et al.

GERALD M. FORLENZA, *Primary Examiner.*
HUGO O. SCHULZ, *Examiner.*
R. G. SHERIDAN, *Assistant Examiner.*